Sept. 29, 1970     H. E. HANDLEY ET AL     3,531,010
UNDERGROUND SERVICE WIRE ENCLOSURE
Filed Dec. 11, 1968
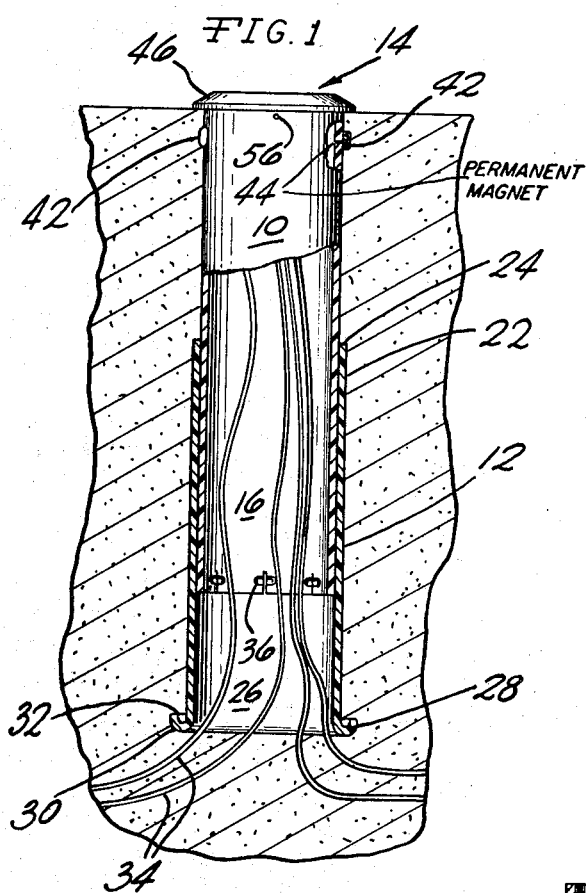
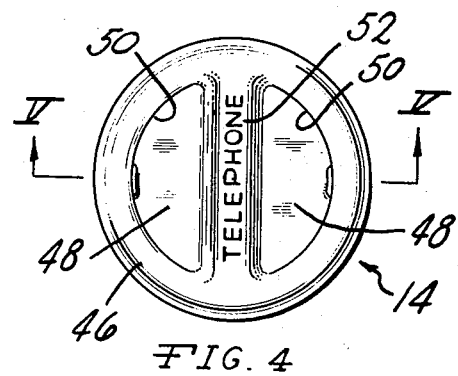
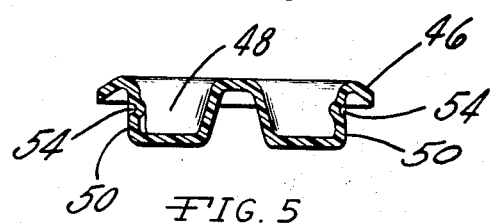
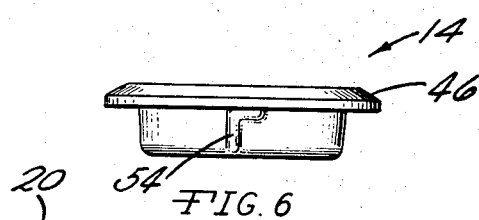
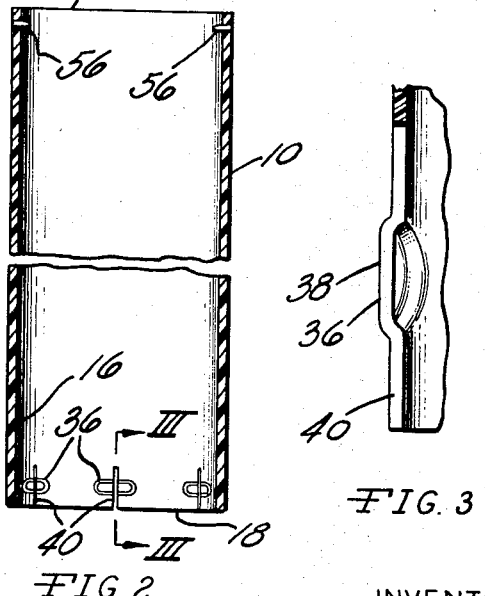
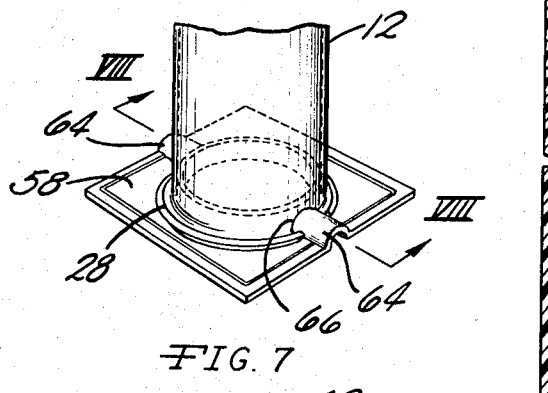
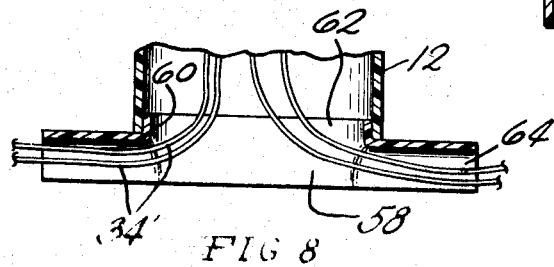
INVENTORS
HAROLD E. HANDLEY
FRANK J. PERRY
RICHARD L. BUNNELL
BY Beaman & Beaman
ATTORNEYS

United States Patent Office 3,531,010
Patented Sept. 29, 1970

3,531,010
UNDERGROUND SERVICE WIRE ENCLOSURE
Harold E. Handley, Frank J. Perry, and Richard L. Bunnell, Jackson, Mich., assignors to Handley Industries, Inc., Jackson, Mich., a corporation of Michigan
Filed Dec. 11, 1968, Ser. No. 782,941
Int. Cl. H02g 9/10
U.S. Cl. 220—40                                        1 Claim

ABSTRACT OF THE DISCLOSURE

An underground service wire enclosure of a relatively inert material consisting of telescopingly assembled upper and lower housing portions utilizing a cap to enclose the upper end of the enclosure, and the lower end being open for receiving subterranean service wires.

BACKGROUND OF THE INVENTION

The invention pertains to subterranean enclosures for receiving underground service wires, such as telephone wires, wherein the enclosure is of a two-piece construction utilizing upper and lower housing portions telescopingly assembled and a cap is employed to enclose the upper end of the enclosure wherein the housing portions define a chamber for receiving service wires, and protecting the same.

It is now becoming common practice to install utility wires servicing homes below the surface of the ground. With the increasing use of domestic underground service wire installations the need has arisen for an enclosure for housing the underground service wire during construction, and also for the purpose of providing access for junction box purposes and other servicing. Previously service wire enclosures for underground wires consisted merely of concrete or tile crocks with heavy cast iron or concrete covers and such enclosures are difficult to orient with the grade, and are susceptible to damage during during periods of construction. To the inventors' knowledge, an underground service box specifically designed for the purpose which could be mounted flush with the ground surface, yet was able to effectively house the service wires, provide ready access for servicing and meet the other requirements of utility companies has not been heretofore available.

SUMMARY OF THE INVENTION

The invention consists of an underground service wire enclosure utilizing upper and lower housing portions of a cylindrical tubular configuration. The housing portions telescopingly engage, the upper portion being received within the lower portion, and friction producing means create predetermined frictional characteristics between the housing portions regulating the force required to telescopingly adjust the housings.

The upper end of the upper housing is enclosed by a removable cap which is adapted to be installed substantially flush with the grade level. The lower end of the housing is provided with a shaped flange having a downwardly disposed convex surface wherein service wires entering the enclosure through the lower end of the lower housing will not be damaged by the enclosure, and the possibility of abrading the service wire with the lower edge of the enclosure is substantially eliminated.

Further, the underground service wire enclosure of the invention utilizes a unique cap which may be readily mounted flush with the ground level, and is not susceptible to damage from above. The cap is formed of a synthetic material, as are the upper and lower housing portions in the preferred embodiment, and the cap includes a centrally disposed recess adapted to be received within the upper end of the upper housing portion, and detent receiving recesses defined upon the cap central region cooperate with detents mounted upon the upper housing portion to removably affix the cover in place. The cap walls upon which the detent receiving recesses are defined are radially flexible to a limited extent, insuring a tight and firm interconnection with the upper housing portion detents.

The lower flange, in addition to providing a convex surface to protect the service wire, also functions as a flange to resist vertical withdrawl of the lower housing portion from the ground once the enclosure has been installed.

It is also desirable to limit the telescoping of the upper housing portion into the lower housing portion, should the enclosure be telescoped together to produce its minimum height, and in order to prevent telescoping of the housing portions to such an extent as to interfere with the placing of the cap upon the enclosure, stops are defined upon the upper housing portion to limit the telescoping engagement. In the preferred embodiment at least one of the housing stops is in the form of a magnet housing for receiving a permanent magnet to facilitate location of the enclosure should it be inadvertently totally buried.

The telescoping cooperation between the upper and lower housing permits the enclosure to be reset to final grade and also prevents damage to the enclosure should a heavy vehicle pass over the same when the ground is soft. Thus, rather than a compressive force crushing the enclosure, the upper housing portion merely telescopes further into the lower housing portion, and the upper housing portion may be readily brought back to its desired vertical position by raising the upper portion relative to the lower portion.

In a variation of the service wire enclosure, a stabilizing base plate may be affixed to the lower end of the lower housing portion to increase the base supporting area for use in those regions desiring a greater area of support prior to backfilling around the enclosure. In this embodiment a substantially flat base plate having an inverted channel is affixed to the lower end of the enclosure, and notches are defined in the lower housing portion to receive the enclosure such that the service wire may pass through the channel and into the lower end of the lower housing portion.

BRIEF DESCRIPTION OF THE DRAWING

The aforementioned objects and advantages of the invention will be appreciated from the following description and accompanying drawings wherein:

FIG. 1 is a diametrical, sectional view of a service wire enclosure in location, constructed in accord with the invention, FIG. 2 is a diametrical, elevational, sectional view of the upper housing portion, FIG. 3 is an enlarged detail, sectional view of a friction producing protuberance as taken along section III—III of FIG. 2, FIG. 4 is a top, plan view of the cap used with the service wire enclosure, FIG. 5 is an elevational, sectional view of the cap as taken along section V—V of FIG. 4, FIG. 6 is an elevational view of the cap as taken from the left of FIG. 4, FIG. 7 is a detail, perspective view of a variation of the service wire enclosure of the invention illustrating the use of a stabilizer base plate, and FIG. 8 is a diametrical, elevational, detail, sectional view of the embodiment of FIG. 7 taken along section VIII—VIII thereof.

DESCRIPTION OF THE PREFERRED EMBODIMENT

The assembled preferred embodiment of the service wire enclosure is illustrated in FIG. 1. The enclosure includes an upper tubular housing portion 10 telescopingly received within the tubular lower housing portion 12, and the upper end of the tubular portion 10 is enclosed by the cap 14.

The housing portions 10 and 12, and the cap 14 are preferably formed of an inert, noncorrosive synthetic plastic material such as a resin-rubber compound, for instance, A.B.S. Polymer. In that the service wire enclosure is mounted below the grade level the formation of the components of this material prevents the components from corroding and becoming inoperable and assures a very long serviceable life.

The housing portions 10 and 12 are preferably of a cylindrical configuration and the upper portion 10 includes a lower region 16 having a lower edge 18. The upper end of the portion 10 is defined by the upper edge 20. The lower housing portion 12 includes an upper region 22 defined by an upper terminating edge 24, and a lower region 26 defined by a lower edge which is formed by the arcuate flange 28.

The arcuate flange 28 extends circumferentially about the lower end of the lower housing portion region 26 and, is in fact, a "rolled back" portion of the lower housing portion. The result of the configuration of this flange is a convex downwardly disposed surface 30 and a concave upwardly disposed surface 32. The convex surface 30 prevents service wires 34, such as telephone wires, entering the enclosure from being damaged by the enclosure due to abrasion or the enclosure pressing down upon the wires. Also, the circumferential flange 28 is important in that it prevents the lower housing portion 12 from being drawn upwardly through the terrain. Thus, the existence of the flange 28 aids in vertically orienting the lower housing portion 12, as well as protecting the service wires entering the enclosure.

The outer diameter of the upper housing portion 10 is only slightly less than the inner diameter of the lower housing portion 12 whereby a relatively close sliding fit between the housing portion occurs minimizing the entrance of dirt between the housing portions. It is also desirable that a relatively high force, such as sixty pounds, be required in the axial direction to produce telescoping adjustment between the housing portions, and to assure such a relationship a plurality of protuberances 36 are defined from the material of the upper housing portion region 16 adjacent the lower edge 18, FIGS. 2 and 3. The protuberances 36 are in the form of "dimples" which extend radially outwardly, having an outer surface 38 which frictionally engages the inner surface of the lower housing portion. In order to permit limited radial deflection of the protuberance 36 inwardly a plurality of axially extending slots 40 are defined in the lower region of the upper housing portion which intersect the protuberances and the edge 18, FIG. 2 and thereby permit radial displacement of the lower region of the upper housing portion at the protuberances. The length of the slots 40 is determined by the thickness of the material, and the resilient characteristics thereof, and the dimensional relationships between the diameters of the housing portions and the radial dimension of the protuberances wherein the desired frictional resistance between the telescoping engagement of the housing portions may be accurately determined and maintained.

Excessive telescoping of the upper housing portion 10 into the lower housing 12 is prevented by the presence of a pair of stops 42 radially extending from the upper housing portion at a location spaced below the upper edge 20 thereof. The stops 42 may be formed of the same material as the housing portion 10 by dimpling or may be a separate member chemically bonded in place. Preferably, one of the stops 42 is of a hollow configuration to receive a permanent magnet 44, FIG. 1 which, when the enclosure is installed, will be located relatively close to the group surface and aids in the location of the enclosure by means of a magnetic dip needle finder in the event that the cap 14 becomes inadvertently buried.

The construction of the cap 14 is best appreciated from FIGS. 4 through 6. This cap may be molded by vacuum forming, or other molding techniques, and may be formed of a sheet material of uniform thickness. The resultant form includes a peripheral downwardly sloping portion 46, and a pair of semicylindrical recesses 48 are defined in the central region of the cap which, together, define a substantially cylindrical recess defined by peripheral walls 50. The resultant "rib" 52 extending diametrically across the cap may include indicia defined thereon to identify the type of service wires enclosed therein. The rib 52 provides a convenient handle whereby high torque forces may be applied to the cap without danger of breakage.

At diametrically opposed locations on the cap inverted L-shaped recesses 54 are defined therein which may be either cut or molded. The recesses 54 form bayonet connections for cooperation with a pair of diametrically related detent pins 56, FIG. 2, affixed to the upper housing portion 10 adjacent the upper edge 20 thereof. Thus, upon aligning the recesses 54 with the pins 56 the cap 14 may be axially inserted upon the housing portion 10 until the upper edge 20 engages the underside of portion 46. Thereupon, the operator will rotate the cap in a direction which shifts the pins into the horizontal portion of the cap recesses to lock the cap in place.

Preferably, the fit between the detent pins 56 and the recesses 54 is snug such that slight inward deflection of the recess side walls 50 adjacent the recesses occurs as the cap is being placed upon the housing. Thus, this deflection of the cap assures the presence of relatively high friction forces which discourage removal of the cap by children, or other unauthorized persons who may be curious and endeavor to rotate the cap. The vertical adjustment of the height of the service wire enclosure as permitted by the telescoping arrangement of the housing portions permits the enclosure height to be adjusted for fitting in the hole or trench in which it is to be mounted that the cap 14 may be positioned at grade level. Also, this telescoping arrangement permits the upper housing portion 10 to telescope into the lower portion 12 should a heavy vehicle pass thereover when the ground is soft, such as during a construction period. In such event the enclosure can be readily restored to its original height by lifting the housing portion 10 relative to the portion 12 against the frictional force imposed by the protuberances 36.

FIGS. 7 and 8 illustrate a modification wherein an enlarged stabilizer base plate may be affixed to the lower end of the lower housing portion 12 for supporting the enclosure in a hole or trench prior to backfilling where rocks or other terrain conditions make support of the previously described embodiment difficult.

The base plate 58 may be of a rectangular configuration having a central circular boss 60 defined therein which includes the central opening 62. The base plate also includes a pair of diametrically opposed inverted channel portions 64 defined in the material thereof, and the lower housing portion 12 is notched at 66 to receive the channels 64, and protect the service wire which will be disposed in the channel from any burrs formed upon the housing portion during the notching thereof.

The lower housing portion 12 is not modified with respect to the previously described embodiment, other than the notching at 66, and the base plate 58, which is preferably formed of the same material as the housing portions may be attached thereto as shown in FIGS. 7 and 8 by stapling or cementing.

In that the service wires 34′ pass through the channels 64 the base plate may rest upon a relatively solid support, and yet provide clearance into the enclosure.

We claim:

1. An underground service wire enclosure comprising, in combination, an upper tubular cylindrical housing portion formed of a relatively inert synthetic plastic material having an upper edge and a lower region and a lower edge, a lower tubular cylindrical housing portion having an upper region and an open lower edge formed of a relatively inert synthetic plastic material, said upper portion lower region being telescopingly received within said lower portion upper region, a cap of relatively inert synthetic plastic material removably mounted upon said upper edge of said upper housing portion, said cap including a pair of axially recessed portions defining diametrically opposed cylindrical segment surfaces received within said upper portion upper edge, first cap locking means defined on said segment surfaces comprising detent receiving recesses defined within said cap segment surfaces, second locking means defined on said upper portion adjacent said upper edge adapted to cooperate with said first locking means upon angularly rotating said cap relative to said upper portion, said second locking means comprising radially inwardly disposed detents mounted upon said upper housing portion receivable within said recesses, said cap segment surfaces being radially deformable inwardly and said detents being of such a length as to deform said surfaces inwardly upon being received within said detent receiving recesses, a diametrically extending rib defined on said cap intermediate said recessed portions partially defining said recessed portions and axially extending the depth of said cap, and a peripheral lip defined on said cap adapted to extend over said upper portion upper edge.

References Cited

UNITED STATES PATENTS

| 80,776 | 8/1868 | Smith | 220—8 |
|---|---|---|---|
| 156,577 | 11/1874 | Latham | 220—8 |
| 192,340 | 6/1877 | Morgan | 220—3.7 |
| 321,483 | 7/1885 | Burrows | 220—8 |
| 455,415 | 7/1891 | Smith | 220—3.7 |
| 479,909 | 8/1892 | Hurley | 220—3.7 |
| 591,884 | 10/1897 | Ryan | 220—3.7 |
| 616,542 | 12/1898 | Koehne | 220—3.7 X |
| 1,116,752 | 11/1914 | Stolk | 220—8 |
| 1,168,122 | 1/1916 | Smith | 220—8 |
| 2,466,075 | 4/1949 | Bentley et al. | 220—8 X |
| 2,931,383 | 4/1960 | Handley | 137—371 X |
| 3,055,970 | 9/1962 | Handley | 174—37 |
| 3,346,230 | 10/1967 | Tolf | 220—8 X |

FOREIGN PATENTS 1,176,622  11/1958  France.

LARAMIE E. ASKIN, Primary Examiner